United States Patent
Saeki et al.

(10) Patent No.: US 8,398,491 B2
(45) Date of Patent: Mar. 19, 2013

(54) TORQUE FLUCTUATION ABSORBING APPARATUS

(75) Inventors: Tomohiro Saeki, Anjo (JP); Masanori Suzuki, Kariya (JP); Yuki Miyamoto, Kariya (JP); Atsushi Yamazumi, Kariya (JP); Masaki Kato, Kariya (JP); Hiroyuki Yamamoto, Toyota (JP); Toshiyuki Saburi, Nagoya (JP); Ryota Akada, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 172 days.

(21) Appl. No.: 12/912,213

(22) Filed: Oct. 26, 2010

(65) Prior Publication Data

US 2011/0098119 A1 Apr. 28, 2011

(30) Foreign Application Priority Data

Oct. 27, 2009 (JP) .................................. 2009-246636
Oct. 8, 2010 (JP) .................................. 2010-228722

(51) Int. Cl.
*F16D 7/02* (2006.01)
(52) U.S. Cl. ...................................... 464/46; 192/107 C
(58) Field of Classification Search .............. 464/45–48; 192/107 C
See application file for complete search history.

(56) References Cited

U.S. PATENT DOCUMENTS

| | | | | | |
|---|---|---|---|---|---|
| 761,943 | A | * | 6/1904 | Brown | 464/45 |
| 2,014,362 | A | * | 9/1935 | Tatter | 192/107 C X |
| 2,097,710 | A | * | 11/1937 | Whitelaw et al. | 192/107 C |
| 2,140,723 | A | * | 12/1938 | Spicer | 464/48 X |
| 3,775,998 | A | * | 12/1973 | Century et al. | 464/46 |
| 4,171,147 | A | * | 10/1979 | Swisher et al. | 464/48 X |
| 7,207,887 | B2 | | 4/2007 | Nakagaito et al. | |
| 7,828,663 | B2 | * | 11/2010 | Saeki et al. | 464/46 |
| 2012/0115620 | A1 | * | 5/2012 | Iwama et al. | 464/46 |

FOREIGN PATENT DOCUMENTS

JP 2005-127507 A 5/2005

* cited by examiner

*Primary Examiner* — Gregory Binda
(74) *Attorney, Agent, or Firm* — Buchanan Ingersoll & Rooney

(57) ABSTRACT

A torque fluctuation absorbing apparatus includes a first plate member, a second plate member rotatable relative to the first plate member, and a first friction member disposed between the first plate member and the second plate member and pressed against the first plate member in a slidable manner. The second plate member includes a first retaining surface that makes contact with the first friction member. The first friction member includes a plurality of grooves at a surface facing the first retaining surface of the second plate member, the grooves extending in a radial direction of the first friction member.

4 Claims, 13 Drawing Sheets

FIG. 5A  Knurling (single type)
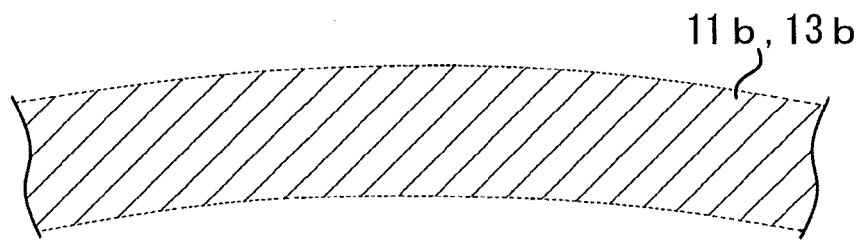
FIG. 5B  Knurling (cross type)
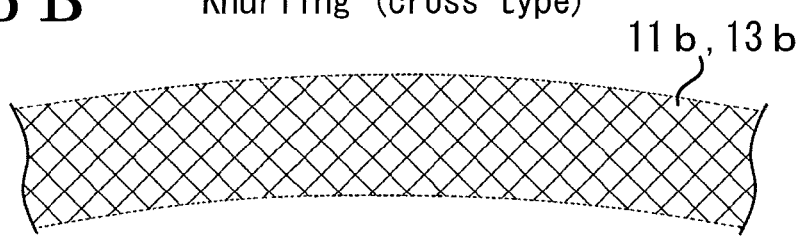
FIG. 5C  Cross section
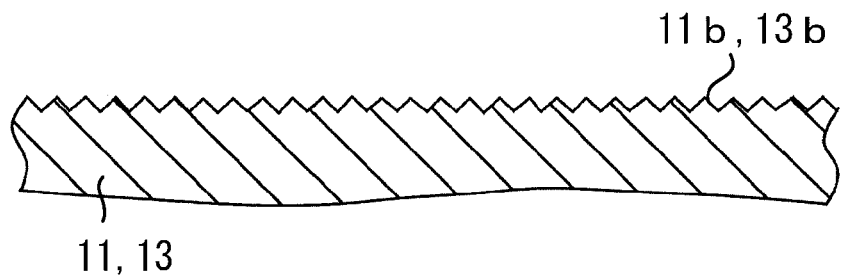

$h \geqq H \times 0.3$

TORQUE FLUCTUATION ABSORBING APPARATUS

CROSS REFERENCE TO RELATED APPLICATIONS

This application is based on and claims priority under 35 U.S.C. §119 to Japanese Patent Applications 2009-246636, filed on Oct. 27, 2009, and 2010-228722 filed on Oct. 8, 2010 the entire contents of which are incorporated herein by reference.

TECHNICAL FIELD

This disclosure relates to a torque fluctuation absorbing apparatus, which absorbs a fluctuating torque between rotating shafts, and includes a limiter portion that generates slippage when the fluctuating torque reaches a predetermined value.

BACKGROUND DISCUSSION

A known torque fluctuation absorbing apparatus is provided, for example, on a drivetrain between an engine and a clutch, and absorbs (restrains) a fluctuating torque generated by an engine and a transmission. The known torque fluctuation absorbing apparatus includes, for example, a damper portion that absorbs the fluctuating torque by means of a spring force, a hysteresis portion that absorbs the fluctuating torque by means of a hysteresis torque generated by friction or the like, and a limiter portion that generates slippage when a torsion of respective rotating shafts of the engine and the transmission is beyond absorption capabilities of the damper portion and the hysteresis portion. The limiter portion includes a lining plate that is provided between a pressure plate and a cover plate. Friction members are fixedly attached to respective side surfaces (i.e., both axial sides) of the lining plate. The limiter portion also includes a disc spring that is provided between a support plate and the pressure plate. The disc spring biases the pressure plate towards the lining plate to thereby push the lining plate towards the cover plate. Accordingly, the friction members fixedly attached to the lining plate are pressed against the pressure plate and the cover plate respectively.

The friction members fixedly attached to the respective side surfaces of the lining plate are generally riveted to the lining plate. JP2005-127507A discloses a torque fluctuation absorbing apparatus in which friction members are adhered to a lining plate or are integrated with the lining plate by means of a through hole formed on the lining plate.

In case the friction members are adhered to the lining plate such as in the limiter portion of the torque fluctuation absorbing apparatus disclosed in JP2005-127507A, the adhesion process may take more time to conduct, thereby increasing a cost. In addition, the adhesive may be insufficiently spread to surfaces via which the friction members and the lining plate are adhered, which may lead to an issue related to the strength of the friction members. Further, in a structure where the friction members are integrated with the lining plate by means of the through hole formed on the lining plate, the friction members may be insufficiently received by the through hole and there may be an issue related to the strength of the friction members.

A need thus exists for a torque fluctuation absorbing apparatus which is not susceptible to the drawback mentioned above.

SUMMARY

According to an aspect of this disclosure, a torque fluctuation absorbing apparatus includes a first plate member, a second plate member rotatable relative to the first plate member, and a first friction member disposed between the first plate member and the second plate member and pressed against the first plate member in a slidable manner. The second plate member includes a first retaining surface that makes contact with the first friction member. The first friction member includes a plurality of grooves at a surface facing the first retaining surface of the second plate member, the grooves extending in a radial direction of the first friction member.

According to another aspect of this disclosure, a torque fluctuation absorbing apparatus includes a first plate member, a second plate member rotatable relative to the first plate member, and a first friction member disposed between the first plate member and the second plate member and pressed against the first plate member in a slidable manner. The second plate member includes a first engagement projection at the first retaining surface. The first friction member includes a first engagement portion formed into either a hole shape, a recess shape, or a cut shape at a surface facing the second plate member, the first engagement portion engaging with the first engagement projection of the second plate member.

According to a further aspect of this disclosure, a torque fluctuation absorbing apparatus includes a first plate member, a second plate member rotatable relative to the first plate member, a first friction member disposed between the first plate member and the second plate member and pressed against the first plate member in a slidable manner, a third plate member arranged at an opposite side of the second plate member relative to the first plate member and being rotatable relative to the first plate member, and a second friction member disposed between the first plate member and the third plate member and pressed against the first plate member in a slidable manner. The third plate member includes a hole and the second plate member includes a detent inserted into the hole of the third plate member in a relatively unrotatable manner and an axially movable manner. The first and second friction members include respective engagement cut portions engaging with the detent of the second plate member.

BRIEF DESCRIPTION OF THE DRAWINGS

The foregoing and additional features and characteristics of this disclosure will become more apparent from the following detailed description considered with the reference to the accompanying drawings, wherein:

FIG. 5A is a first partial plane view schematically illustrating the structure of the retaining surface of the cover plate and the retaining surface of the pressure plate according to a fourth embodiment disclosed here;

FIG. 5B is a second partial plane view schematically illustrating the structure of the retaining surface of the cover plate and the retaining surface of the pressure plate according to the fourth embodiment;

FIG. 5C is a partial section view illustrating the structure of the retaining surface of the cover plate and the retaining surface of the pressure plate according to the fourth embodiment;

DETAILED DESCRIPTION

Figure 1:
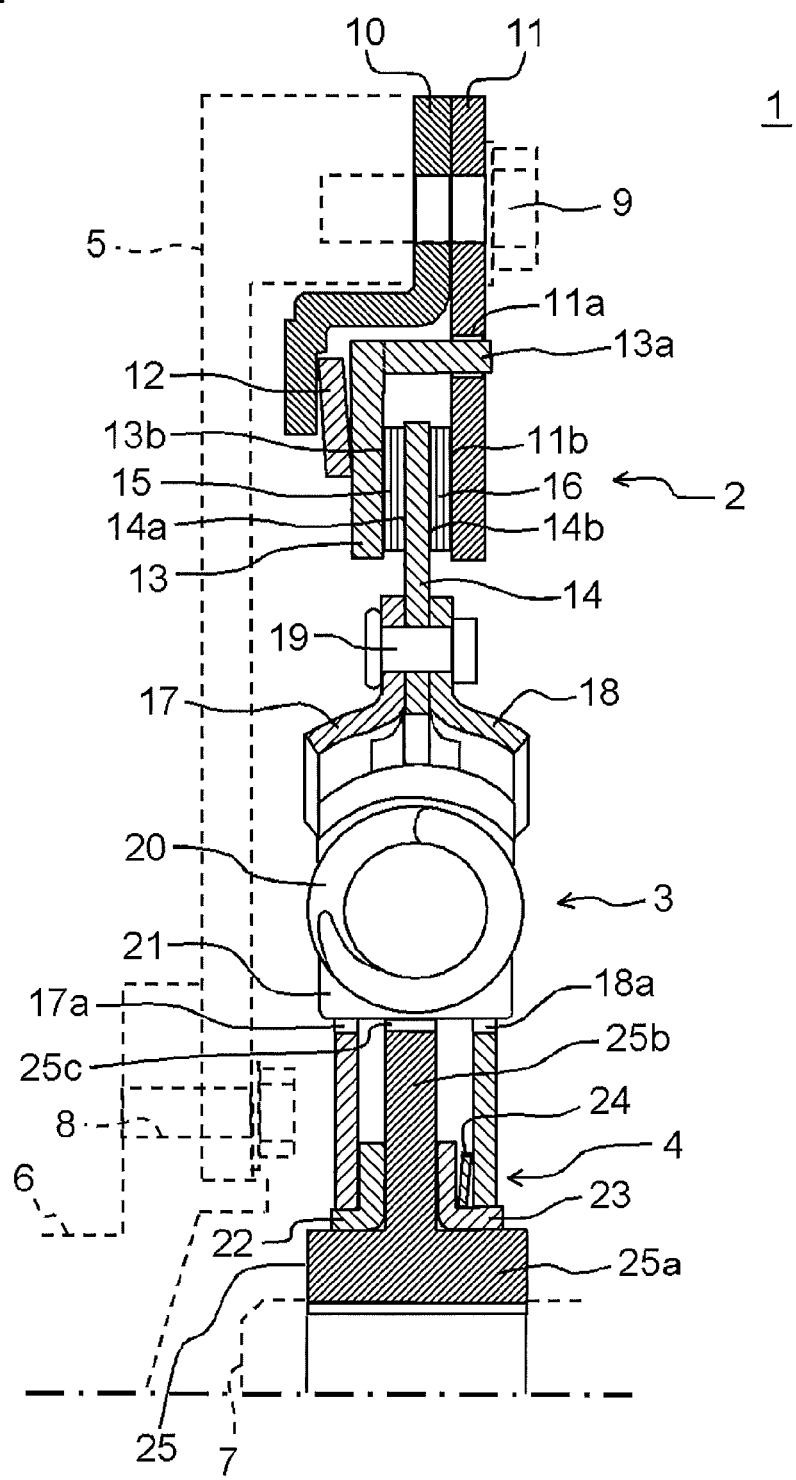
FIG. 1 is a partial radial section view schematically illustrating a structure of a torque fluctuation absorbing apparatus according to a first embodiment disclosed here.
Figure 2A:
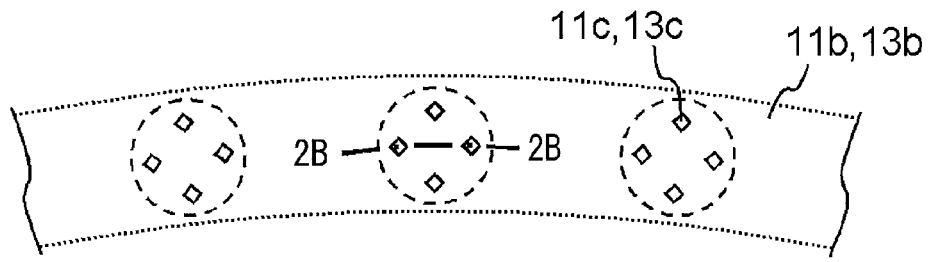
FIG. 2A is a partial plane view schematically illustrating a structure of a retaining surface of a cover plate and a retaining surface of a pressure plate according to the first embodiment.
Figure 2B:
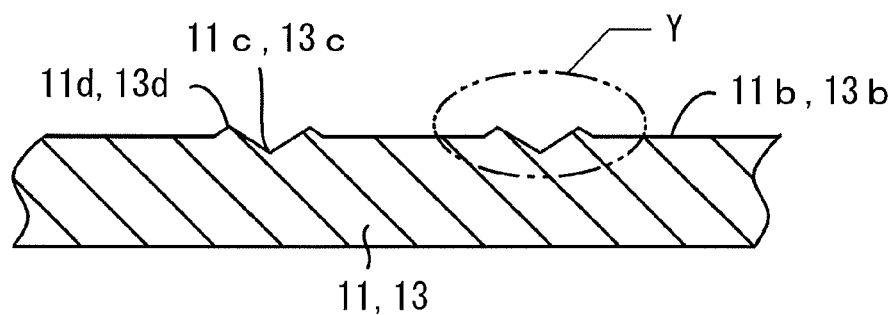
FIG. 2B is a partial section view taken on line 2B-2B illustrated in FIG. 2A.
Figure 2C:
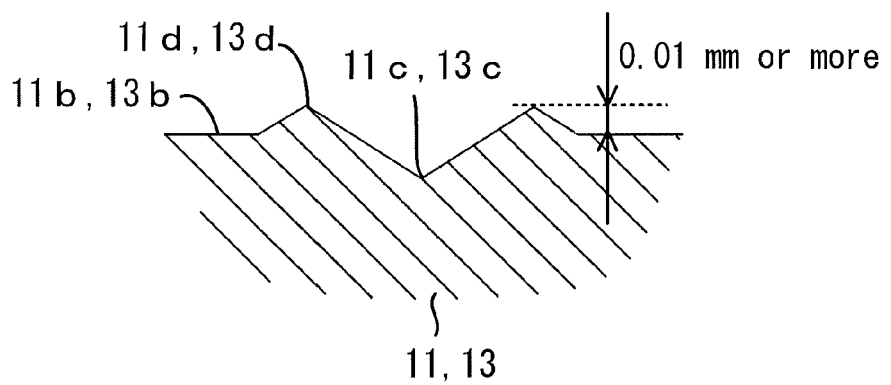
FIG. 2C is a partial section view of an area Y illustrated in FIG. 2B.

A first embodiment of this disclosure will be explained with reference to illustrations of drawings as follows. FIG. 1 is a partial radial section view schematically illustrating a torque fluctuation absorbing apparatus 1 according to a first embodiment. FIG. 2A is a partial plane view schematically illustrating a structure of a retaining surface 11b of a cover plate 11 and a retaining surface 13b of a pressure plate 13 according to the first embodiment. FIG. 2B is a partial section view taken on line 2B-2B illustrated in FIG. 2A. FIG. 2C is a partial section view of an area Y illustrated in FIG. 2B.

As shown in FIG. 1, the torque fluctuation absorbing apparatus 1 is provided, for example, on a drivetrain between a rotating shaft 6 that is coupled to an engine and a rotating shaft 7 that is coupled to a transmission so as to absorb (restrain) a fluctuating torque generated by a torsion of the rotating shaft 6 and the rotating shaft 7, that is, a torque fluctuation between the rotating shaft 6 and the rotating shaft 7. The torque fluctuation absorbing apparatus 1 includes a damper portion 3, a hysteresis portion 4 and a limiter portion 2. The damper portion 3 has a torsion-absorbing function and absorbs the fluctuating torque by means of a spring force. The hysteresis portion 4 absorbs (restrains) the fluctuating torque by means of a hysteresis torque generated by friction or the like. The limiter portion 2 generates slippage when the torsion of the rotating shaft 6 and the rotating shaft 7 is beyond absorption capabilities of the damper portion 3 and the hysteresis portion 4. The limiter portion 2 is placed parallelly with the damper portion 3 and with the hysteresis portion 4 in the drivetrain. The damper portion 3 is placed serially with the hysteresis portion 4 in the drivetrain. The torque fluctuation absorbing apparatus 1 is applicable to a hybrid vehicle that has no limiter portion. The torque fluctuation absorbing apparatus 1 is also applicable to a vehicle having the limiter portion and is effective in downsizing of a drivetrain system.

The torque fluctuation absorbing apparatus 1 includes a support plate 10, the cover plate 11 serving as a third plate member, a disc spring 12, the pressure plate 13 serving as a second plate member, a lining plate 14 serving as a first plate member, friction members 15, 16 serving as first and second friction members, a first side plate 17, a second side plate 18, a rivet 19, a coil spring 20, a seat member 21, a first thrust member 22, a second thrust member 23, a disc spring 24 and a hub member 25.

In the embodiments of this disclosure, the terms "axial", "radial", "circumferential", "peripheral" and derivatives thereof are used based on the lining plate 14, unless otherwise specified. The support plate 10, which constitutes the limiter portion 2, is formed into a ring shape and placed axially between a flywheel 5 and the cover plate 11. A radially outward portion of the support plate 10 is in contact with the cover plate 11 in an axial direction and is securely fastened, together with the cover plate 11, to the flywheel 5 by means of a bolt 9. A radially inward portion of the support plate 10 is axially apart from the cover plate 11. The support plate 10 and the disc spring 12 are pressed against each other. The flywheel 5 is mounted on the rotating shaft 6 that is coupled to the engine by means of a bolt 8.

The cover plate 11, which constitutes the limiter portion 2, is formed into a ring shape and is placed on the opposite side to the flywheel 5 relative to the support plate 10 (on the right side relative to the support plate 10 in FIG. 1). That is, the flywheel 5, the support plate 10, the cover plate 11 and the transmission are axially arranged in this order, the flywheel 5 being closest to the engine. A radially outward portion of the cover plate 11 is in contact with the support plate 10 in the axial direction, and is securely fastened, together with the support plate 10, to the flywheel 5 by means of the bolt 9. A radially inward portion of the cover plate 11 is axially apart from the support plate 10. The cover plate 11 includes a hole 11a which supports the pressure plate 13 in a manner that the pressure plate 13 moves in the axial direction but the pressure plate 13 does not rotate relative to the cover plate 11. A detent 13a of the pressure plate 13 is inserted into the hole 11a so as to move in the axial direction but so as not to rotate relative to the cover plate 11. The cover plate 11 includes the retaining surface 11b, serving as a second retaining surface, that retains the friction member 16 at the radially inward portion of the cover plate 11. A treatment for increasing a friction coefficient is conducted on the retaining surface 11b, which makes it difficult to move the friction member 16 relative to the cover plate 11. Accordingly, a position where the friction member 16 is retained relative to the cover plate 11 is determined. The friction coefficient between the retaining surface 11b and the friction member 16 is set to be greater than a friction coefficient between the lining plate 14 and the friction member 16.

As shown in FIGS. 2A, 2B and 2C, the retaining surface 11b includes a recess 11c and a projection 11d. The recess 11c is formed on a flat surface (i.e., a flat portion) of the retaining surface 11b and is recessed, that is, dented, relative to the flat portion. The projection 11d is formed around a peripheral edge of the recess 11c so as to project, that is, to be raised, from the flat portion. The recess 11c and the projection 11d are formed by die punching performed on the retaining surface 11b. An area that is processed in a single punching action, i.e., by the die punching one time (the area indicated by the dashed line in FIG. 2A) includes a predetermined pattern formed by the recess 11c (including the projection 11d). The area (i.e. a punched area) includes four or more of the recesses 11c, desirably, for example, ten to thirty recesses 11c. A diameter of the punched area is 20 millimeters or less, and the retaining surface 11b includes multiple punched areas, desirably, for example, six or more punched areas. A height of the projection 11d from the flat portion is, desirably, for example, 0.01 millimeters or more. The recess 11c is shaped so that the center of the bottom of the recess 11c is the deepest and that the center of the bottom makes an angle of, desirably, for example, 120 degrees or less when viewed in the cross section (refer to FIG. 2C). The retaining surface 11b may be entirely or partially formed by one of or both of the projections 11d and the recesses 11c for generating a slip resistance relative to the friction member 16.

The disc spring 12, which constitutes the limiter portion 2, is placed axially between the support plate 10 and the pressure plate 13 as shown in FIG. 1. The disc spring 12 biases the pressure plate 13 toward the friction member 15.

The pressure plate 13, which constitutes the limiter portion 2, is formed into a ring shape and is placed axially between the disc spring 12 and the friction member 15. The pressure plate 13 includes the detent 13a by which the pressure plate 13 is supported relative to the cover plate 11 in the manner to move in the axial direction but not to rotate relative to the cover plate 11. The detent 13a is inserted into the hole 11a of the cover plate 11 so as to move in the axial direction but so as not to move in the circumferential direction of the cover plate 11 relative to the cover plate 11. The pressure plate 13 is biased toward the friction member 15 by the disc spring 12. The pressure plate 13 includes the retaining surface 13b, serving as a first retaining surface, that retains the friction member 15. A treatment for increasing a friction coefficient is conducted on the retaining surface 13b, which makes it difficult to move the friction member 15 relative to the pressure plate 13. Accordingly, a position where the friction member 15 is retained relative to the pressure plate 13 is determined. The friction coefficient between the retaining surface 13b and the friction member 15 is set to be greater than a coefficient friction between the lining plate 14 and the friction member 15.

As shown in FIGS. 2A, 2B and 2C, the retaining surface 13b includes a recess 13c and a projection 13d. The recess 13c is formed on a flat surface (i.e., a flat portion) of the retaining surface 13b and is recessed, that is, dented, relative to the flat portion. The projection 13d is formed around a peripheral edge of the recess 13c so as to project, that is, to be raised, from the flat portion. The recess 13c and the projection 13d are formed by die punching performed on the retaining surface 13b. The area that is processed in the single punching action (the area indicated by the dashed line in FIG. 2A) includes the predetermined pattern formed by the recess 13c (including the projection 13d). The area (i.e. the punched area) includes four or more of the recesses 13c, desirably, for example, ten to thirty recesses 13c. A diameter of the punched area is 20 millimeters or less, and the retaining surface 13b includes multiple punched areas, desirably, for example, six or more punched areas, on the retaining surface 13b. A height of the projection 13d from the flat portion is, desirably, for example, 0.01 millimeters or more. The recess 13c is shaped so that the center of the bottom of the recess 13c is the deepest and that the center of the bottom makes an angle of, for example, 120 degrees or less when viewed in the cross section (refer to FIG. 2C). The retaining surface 13b may be entirely or partially formed by one of or both of the projections 13d and the recesses 13c for generating a slip resistance relative to the friction member 15.

The lining plate 14, which constitutes the limiter portion 2, is formed into a ring shape and is placed axially between the friction members 15 and 16 both of which are placed axially between the pressure plate 13 and the cover plate 11 as shown in FIG. 1. A radially inward portion of the lining plate 14 is sandwiched between the first side plate 17 and the second side plate 18. The lining plate 14, the first side plate 17 and the second side plate 18 are securely fastened to one another by means of the rivet 19. A radially outward portion of the lining plate 14 extends to be positioned axially between the friction members 15 and 16, and is pressed against the friction members 15, 16 in a manner that the lining plate 14 circumferentially slides relative to the friction members 15, 16. The lining plate 14 may be made of a material that is less likely to rust (desirably, for example, a stainless material) in order to prevent the lining plate 14 from sticking to the friction members 15, 16 due to the rust. In order to ensure a friction coefficient μ, a surface treatment (for example, plating), a heat treatment or a surface roughing treatment may be desirably performed on the lining plate 14. To perform the surface roughing treatment, a projection-and-recess pattern may be transferred on the surface of the lining plate 14 by means of a roller. Alternatively, an abrasive paper or an abrasive brush may be used to polish the surface of the lining plate 14. The friction coefficient between the lining plate 14 and the friction member 16 is set to be smaller than the friction coefficient between the retaining surface 11b of the cover plate 11 and the friction member 16. The friction coefficient between the lining plate 14 and the friction member 15 is set to be smaller than the friction coefficient between the retaining surface 13b of the pressure plate 13 and the friction member 15.

The friction member 15, which constitutes the limiter portion 2, is placed axially between the lining plate 14 and the pressure plate 13 as shown in FIG. 1. The friction member 15 is formed into a ring shape and, a surface of the friction member 15 is formed to be flat. The friction member 15 is retained by the retaining surface 13b of the pressure plate 13. The friction member 15 is pressed against the lining plate 14 in a manner that the friction member 15 circumferentially slides relative to the lining plate 14. The friction member 15 may be made of a material that includes rubber, resin, fiber (short fiber or long fiber), particles for adjusting the friction coefficient μ, or the like.

The friction member 16, which constitutes the limiter portion 2, is placed axially between the lining plate 14 and the cover plate 11 as shown in FIG. 1. The friction member 16 is formed into a ring shape and, a surface of the friction member 16 is formed to be flat. The friction member 16 is retained by the retaining surface 11b of the cover plate 11. The friction member 16 is pressed against the lining plate 14 in a manner that the friction member 16 circumferentially slides relative to the lining plate 14.

The first side plate 17, which constitutes the damper portion 3 and the hysteresis portion 4, is formed into a ring shape and is placed axially between a flange 25b of the hub member 25 and the engine (on the left side of the flange 25b in FIG. 1). A portion that is approximate to a radially outward end of the second side plate 17, the lining plate 14 and the second side plate 18 are fastened integrally with one another by means of the rivet 19. The first side plate 17 includes, in the damper portion 3 that is positioned in a radially intermediate portion of the side plate 17, a window portion 17a for accommodating the coil spring 20 and the seat member 21. Each of the circumferential end faces of the window portion 17a is in contact with the seat member 21 so as to be in and out of contact with the seat member 21. The first side plate 17 is in contact with the first thrust member 22 in a manner that the side plate 17 circumferentially slides relative to the thrust member 22 at a radially more inward portion than the damper portion 3, i.e., the hysteresis portion 4. A radially inward end of the first side plate 17 is supported by the hub member 25 (a hub portion 25a) via the first thrust member 22 so as to be rotatable relative to the hub member 25.

The second side plate 18, which constitutes the damper portion 3 and the hysteresis portion 4, is formed into a ring shape and is placed between the flange 25b of the hub member 25 and the transmission (on the right side of the flange 25b in FIG. 1). A portion that is approximate to a radially outward end of the second side plate 18, the lining plate 14 and the first side plate 17 are fastened integrally with one another by means of the rivet 19. The second side plate 18 includes, in the damper portion 3 that is positioned in a radially intermediate portion of the side plate 18, a window portion 18a for accommodating the coil spring 20 and the seat member 21. Each of the circumferential end faces of the window portion 18a is in contact with the seat member 21 so as to be in and out of contact with the seat member 21. The second side plate 18 supports the disc spring 24 at a radially more inward portion than the damper portion 3, i.e., the hysteresis portion 4. A radially inward end of the second side plate 18 is supported by the hub member 25 (the hub portion 25a) via the second thrust member 23 so as to be rotatable relative to the hub member 25.

The rivet 19 fastens the lining plate 14, the first side plate 17 and the second side plate 18 integrally with one another.

The coil spring 20, which constitutes the damper portion 3, is accommodated in the window portion 17a, the window portion 18a and a window portion 25c that are formed at the first side plate 17, the second side plate 18 and the hub member 25 (the flange 25b) respectively. The circumferential ends of the coil spring 20 are in contact with the seat members 21, 21 that are provided on the circumferential ends of the coil spring 20. The coil spring 20 is compressed when the side plates 17, 18 rotate relative to the hub member 25, and absorbs a shock generated by a rotational difference between the side plates 17, 18 and the hub member 25. The coil spring 20 may be formed to have a straight shape in the circumferential direction of the first and second side plates 17, 18. Alternatively, the coil spring 20 may be formed into the straight shape, and then may be bent to form an arc in the circumferential direction of the first and second side plates 17, 18 while being assembled. Alternatively, an arc spring having the arc shape in the circumferential direction of the side plates 17, 18 may be used so as to respond to a large torsion.

The seat members 21, which constitute the damper portion 3, are accommodated in the window portion 17a, the window portion 18a and the window portion 25c that are formed at the side plate 17, the side plate 18 and the hub member 25 (the flange 25b) respectively. The seat members 21 are provided between the circumferential end faces of the window portions 17a, 18a, 25c, and the circumferential ends of the coil spring 20. The seat member 21 may be made of resin so as to decrease abrasion of the coil spring 20.

The first thrust member 22, which constitutes the hysteresis portion 4, is formed into a ring shape and is placed between the first side plate 17 and the hub member 25. The first thrust member 22 is positioned between the first side plate 17 and the flange 25b in the axial direction, and is pressed against the first side plate 17 and against the flange 25b in a manner that the first thrust member 22 circumferentially slides relative to the first side plate 17 and the flange 25b. Also, the first thrust member 22 is positioned between the first side plate 17 and the hub portion 25a in the radial direction, and serves as a sliding bearing (a bush) supporting the first side plate 17 so that the first side plate 17 rotates relative to the hub portion 25a.

The second thrust member 23, which constitutes the hysteresis portion 4, is formed into a ring shape and is placed between the second side plate 18 and the hub member 25. The second thrust member 23 is positioned between the disc spring 24 and the flange 25b in the axial direction, and is biased toward the flange 25b by the disc spring 24 so that the second thrust member 23 is pushed against the flange 25b in a circumferentially slidable manner relative to the flange 25b. Also, the second thrust member 23 is positioned between the second side plate 18 and the hub portion 25a in the radial direction, and serves as a sliding bearing (a bush) supporting the second side plate 18 so that the second side plate 18 rotates relative to the hub portion 25a.

The disc spring 24 is a disc-shaped spring constituting the hysteresis portion 4. The disc spring 24 is provided axially between the second thrust member 23 and the second side plate 18 so as to bias the second thrust member 23 toward the flange 25b.

The hub member 25 constitutes the damper portion 3 and the hysteresis portion 4, and outputs a rotative power which is transmitted from the damper portion 3 and the hysteresis portion 4 to the transmission. The hub member 25 includes the flange 25b radially outwardly protruding from an outer periphery of the hub portion 25a. An inner periphery of the hub portion 25a is spline-engaged with the rotating shaft 7 that is coupled to the transmission. The outer periphery of the hub portion 25a supports the first side plate 17 via the first thrust member 22, and supports the second side plate 18 via the second thrust member 23 in a manner that the first side plate 17 and the second side plate 18 rotate relative to the hub portion 25a. The flange 25b includes, in the damper portion 3 positioned in a radially outward portion of the flange 25b, the window portion 25c for accommodating the coil spring 20 and the seat members 21. Each of the circumferential end faces of the window portion 25c is in contact with the seat member 21 so as to be in and out of contact with the seat member 21. The flange 25b is supported by the first thrust member 22 and the second thrust member 23 at the radially more inward portion than the damper portion 3, i.e., the hysteresis portion 4. More particularly, the flange 25b is axially sandwiched, in the hysteresis portion 4, between the first thrust member 22 and the second thrust member 23 in a manner that the flange 25b circumferentially slides relative to the first thrust member 22 and the second thrust member 23.

In the first embodiment, axial surfaces of the lining plate 14, which oppose the friction members 15, 16 respectively, refer to sliding surfaces. An axial surface of the cover plate 11, which opposes the friction member 16, and an axial surface of the pressure plate 13, which opposes the friction member 15, refer to the retaining surfaces. Alternatively, the recesses 11c, 13c and the projections 11d, 13d shown in FIGS. 2A, 2B and 2C may be formed on the lining plate 14 instead of on the cover plate 11 and on the pressure plate 13. In this case, the axial surfaces of the lining plate 14, which oppose the friction members 15, 16 respectively, refer to the retaining surfaces. The axial surface of the cover plate 11, which opposes the friction member 16, and the axial surface of the pressure plate 13, which opposes the friction member 15, refer to the sliding surface.

According to the first embodiment, the recesses 11c, 13c and the projections 11d, 13d are formed on the cover plate 11 and on the pressure plate 13. Accordingly, the axial surfaces of the lining plate 14, which oppose the friction members 15, 16 respectively, refer to the sliding surfaces, the axial surface of the cover plate 11, which opposes the friction member 16, and the axial surface of the pressure plate 13, which opposes the friction member 15, refer to the retaining surfaces. Consequently, there is no need for securely attaching the friction members 15, 16 to other members by means of an adhesive, and thus a cost is reduced. Further, the number of parts is reduced, which further reduces the cost. Still further, the sliding surfaces are determined to be between the lining plate 14 and the friction member 15, and between the lining plate 14 and the friction member 16, and thus a slipping torque generated at the limiter portion 2 is stabilized. Still further, no backlash occurs between the cover plate 11 and the friction member 16, or between the pressure plate 13 and the friction member 15. This reduces abrasions of the related members. Still further, the recesses 11c, 13c and the projections 11d, 13d are formed by the die punching performed on the cover plate 11 and on the pressure plate 13, and thus variations of dimensions or positions of the recesses 11c, 13c and the projections 11d, 13d are reduced. Still further, the projections 11d, 13d formed on the cover plate 11 and the pressure plate 13 make the surfaces of the friction members 15, 16 dented instead of piercing the friction members 15, 16. Then, the surfaces of the friction members 15, 16 are pushed into the recesses 11c, 13c formed on the cover plate 11 and the pressure plate 13. This prevents cracks from occurring on the friction members 15, 16, thereby retaining the friction members 15, 16 in place while securing strength of the friction members 15, 16.

Figure 3A:
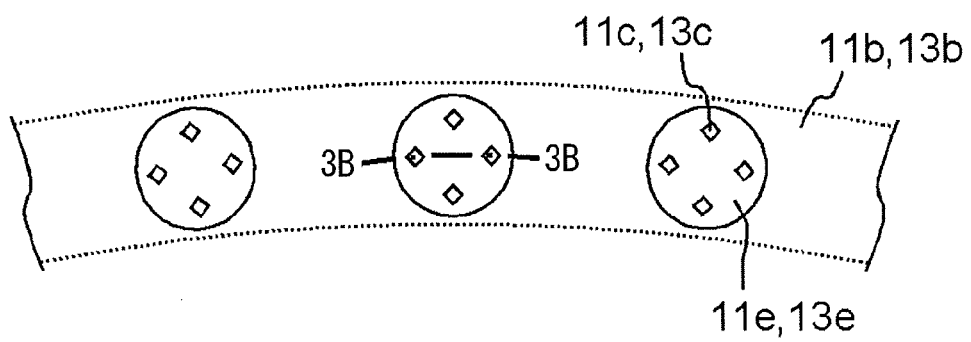
FIG. 3A is a partial plane view schematically illustrating the structure of the retaining surface of the cover plate and the retaining surface of the pressure plate according to a second embodiment disclosed here.
Figure 3B:
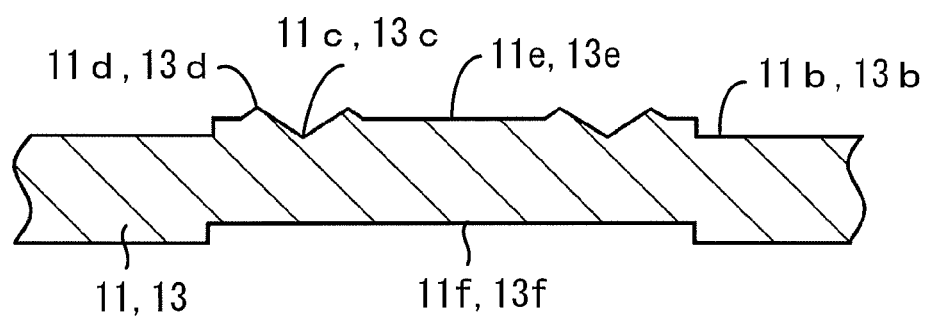
FIG. 3B is a partial section view taken on line 3B-3B illustrated in FIG. 3A.

A second embodiment of this disclosure will be explained with reference to illustrations of drawings as follows. FIG. 3A is a partial plane view schematically illustrating the structure of the retaining surface 11b of the cover plate 11 and the retaining surface 13b of the pressure plate 13 of the second embodiment. FIG. 3B is a partial section view taken on line 3B-3B illustrated in FIG. 3A.

According to the second embodiment, which is a variation of the first embodiment, stepped projections 11e, 13e and stepped recesses 11f, 13f are additionally formed on the cover plate 11 and the pressure plate 13. Other structures of the second embodiment are identical to those of the first embodiment, and thus explanations will be omitted.

The retaining surfaces 11b, 13b include the stepped projections 11e, 13e that project evenly from the flat surfaces (flat portions) of the retaining surfaces 11b, 13b so as to form table-like projections or shapes. The recesses 11c, 13c are formed at predetermined portions of the stepped projections 11e, 13e so as to be recessed, that is, dented, from respective surfaces of the stepped projections 11e, 13e. The projections 11d, 13d are formed around the peripheral edges of the recesses 11c, 13c so as to project, that is, to be raised, from the respective surfaces of the stepped projections 11e, 13e. The cover plate 11 and the pressure plate 13 also include the stepped recesses 11f, 13f, respectively. Specifically, the cover plate 11 includes the stepped recess 11f at an opposite surface relative to the retaining surface 11b, i.e., at one of the axial sides where the recess 11c, the projection 11d, and the stepped projection 11e are not formed (which will be hereinafter referred to as an opposite surface of the retaining surface 11b). In the same way, the pressure plate 13 includes the stepped recess 13f at an opposite surface relative to the retaining surface 13b, i.e., at one of the axial sides where the recess 13c, the projection 13d, and the stepped projection 13e are not formed (which will be hereinafter referred to as an opposite surface of the retaining surface 13b). The stepped recesses 11f, 13f, which are recessed or dented from flat surfaces (flat portions) of the opposite surfaces of the retaining surfaces 11b, 13b, axially face the stepped projections 11e, 13e respectively. The stepped projections 11e, 13e, the recesses 11c, 13c, the projections 11d, 13d, and the stepped recesses 11f, 13f are formed by first die punching on the retaining surfaces 11b, 13b and second die punching on the opposite surfaces of the retaining surfaces 11b, 13b of the cover plate 11 and the pressure plate 13. Side walls of the stepped projections 11e, 13e, that is, circumferentially outer surfaces of the stepped projections 11e, 13e that are formed into the table-like shapes, are perpendicular to the flat portions of the retaining surfaces 11b, 13b. Each of the stepped projections 11e, 13e includes a predetermined pattern formed by the recesses 11c, 13c. Each of the stepped projections 11e, 13e includes four or more of the recesses 11c, 13c, desirably, for example, ten to thirty recesses 11c, 13c. A diameter of each of the step projections 11e, 13e is 20 millimeters or less. The retaining surfaces 11b, 13b include the multiple stepped projections 11e, 13e, desirably, for example, six or more of the stepped projections 11e, 13e. A height of each of the projections 11d, 13d from the surfaces of the stepped projections 11e, 13e is, desirably, for example, 0.01 millimeters or more. Each of the recesses 11c, 13c is shaped so that the center of the bottom thereof is the deepest and that the center of the bottom makes an angle of, desirably, for example, 120 degrees or less when viewed in the cross section (refer to FIG. 3C).

According to the second embodiment, advantages similar to the first embodiment are attained.

Figure 4A:
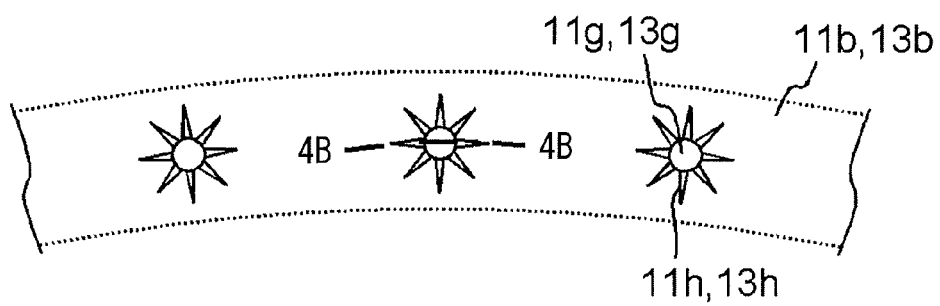
FIG. 4A is a partial plane view schematically illustrating the structure of the retaining surface of the cover plate and the retaining surface of the pressure plate according to a third embodiment disclosed here.
Figure 4B:
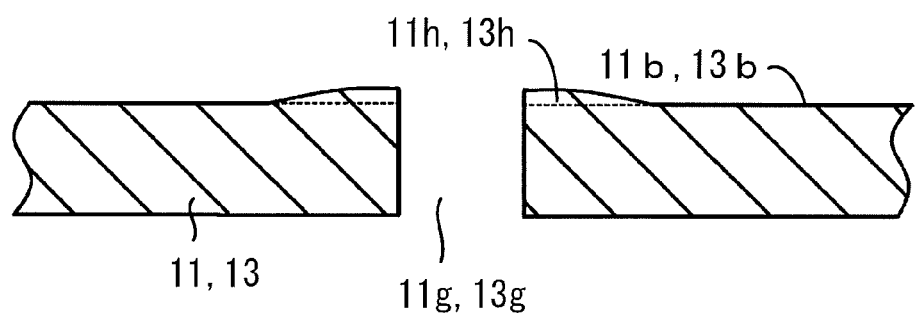
FIG. 4B is a partial section view taken on line 4B-4B illustrated in FIG. 4A.

A third embodiment of this disclosure will be explained with reference to illustrations of drawings as follows. FIG. 4A is a partial plane view schematically illustrating the structure of the retaining surface 11b of the cover plate 11 and the retaining surface 13b of the pressure plate 13 of the third embodiment. FIG. 4B is a partial section view taken on line 4B-4B illustrated in FIG. 4A.

According to the third embodiment, which is a variation of the first embodiment, through holes 11g, 13g are formed in the axial direction on the punched area of the retaining surfaces 11b, 13b respectively. Multiple convexes 11h, 13h are formed at each of the perimeters of the through holes 11g, 13g so as to project, that is, be raised, from the flat portions of the retaining surfaces 11b, 13b. Other structures of the third embodiment are identical to those of the first embodiment, and thus explanations will be omitted.

As shown in FIG. 4A, the convexes 11h, 13h are arranged about the through holes 11g, 13g in a radial manner relative to the through holes 11g, 13g, and are formed so that a width of each of the convexes 11h, 13h is smaller at a portion away from the through holes 11g, 13g than at a portion closer to the through holes 11g, 13g, thereby representing a pointed radial end. As shown in FIG. 4B, an axially extending portion of each of the convexes 11h, 13h, which axially extends from an inner wall of each of the through holes 11g, 13g, is formed to be perpendicular to the flat surface of each of the retaining surfaces 11b, 13b. In addition, a height of each of the convexes 11h, 13h is smaller at the portion away from the through holes 11g, 13g than at the portion closer to the through holes 11g, 13g. That is, the height of each of the convexes 11h, 13h in the axial direction of the pressure plate 13 and the width of each of the convexes 11h, 13h in a direction substantially perpendicular to the axial direction decreases in association with an increase of a radial distance from the through hole 11g, 13g so that each of the convexes 11h, 13f forms a sharpened edge. The convexes 11h, 13h and the through holes 11g, 13g may be formed by the first die punching on the retaining surfaces 11b, 13b, and the second die punching on the opposite surfaces of the retaining surfaces 11b, 13b of the cover plate 11 and the pressure plate 13. The height of each of the convexes 11h, 13h is, desirably, for example, 0.01 millimeters or more from the flat portion of each of the retaining surfaces 11b, 13b.

According to the third embodiment, advantages similar to the first embodiment are attained.

A fourth embodiment of this disclosure will be explained with reference to illustrations of drawings as follows. FIGS. 5A and 5B are first and second partial plane views schematically illustrating the structure of the retaining surface 11b of the cover plate 11 and the retaining surface 13b of the pressure plate 13 of the fourth embodiment. FIG. 5C is a partial section view illustrating the structure of the retaining surface 11b of the cover plate 11 and the retaining surface 13b of the pressure plate 13 of the fourth embodiment.

According to the fourth embodiment, which is a variation of the first embodiment, each of the retaining surfaces 11b, 13b of the cover plate 11 and the pressure plate 13 includes a knurled surface (that is, a surface having a pattern of raised-up areas and depressed areas). The knurling process is available in two types: a single type where a series of ridges are applied in one direction as shown in FIG. 5A, and a cross type where a series of ridges are applied in two directions as shown in 5B. The knurled surface has the pattern of the raised-up areas and the depressed areas, which are formed by alternate ridges and grooves. Other structures of the fourth embodiment are identical to those of the first embodiment, and thus explanations will be omitted.

According to the fourth embodiment, advantages similar to the first embodiment are attained. The advantages will be further enhanced by applying the cross-type knurling to the retaining surfaces 11b, 13b of the cover plate 11 and the pressure plate 13.

Figure 6A:
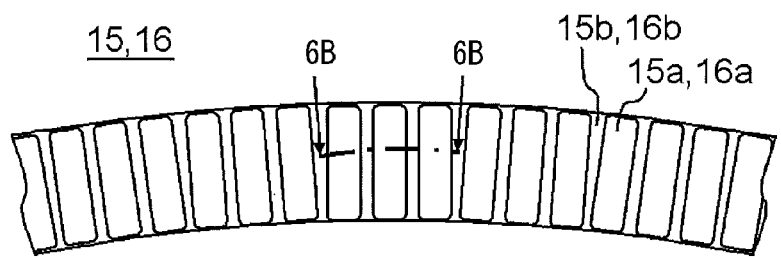
FIG. 6A is a partial plane view schematically illustrating a structure of the friction members according to a fifth embodiment disclosed here.
Figure 6B:
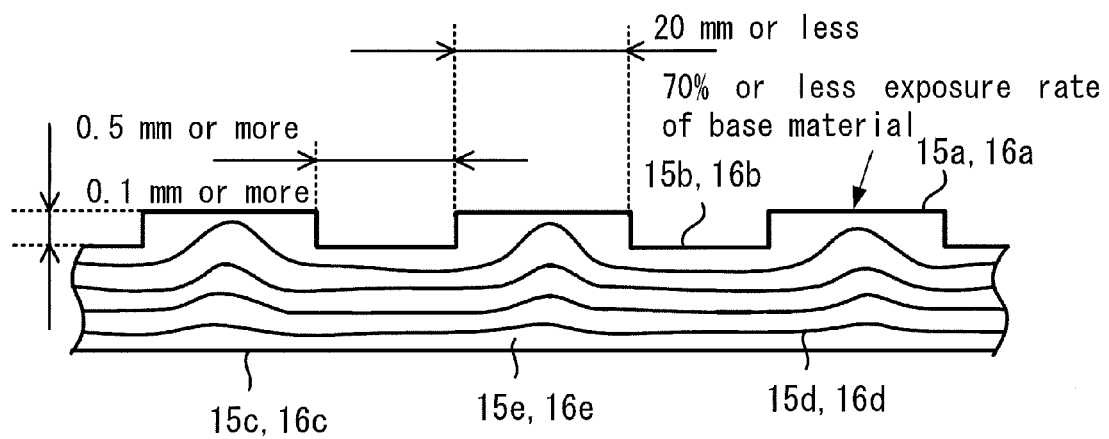
FIG. 6B is a partial section view taken on line 6B-6B illustrated in FIG. 6A.

A fifth embodiment of this disclosure will be explained with reference to illustrations of drawings as follows. FIG. 6A is a partial plane view schematically illustrating a structure of the friction members 15, 16. FIG. 6B is a partial section view taken on line 6B-6B illustrated in FIG. 6A.

A fifth embodiment is a variation of the first embodiment. In the first embodiment, the surfaces of the friction members 15, 16, which oppose the retaining surfaces 13b, 11b of the pressure plate 13 and the cover plate 11 (refer to FIG. 1) respectively, are formed into a flat shape. In the fifth embodiment, the surfaces of the friction members 15, 16, which oppose the retaining surfaces 13b, 11b of the pressure plate 13 and the cover plate 11, have projection-recess shapes or concavo-convex shapes (plural grooves 15b, 16b are formed in the radial direction) to serve as retaining surfaces 15a, 16a (surfaces) of the friction members 15, 16. Consequently, the friction members 15, 16 in contact with the retaining surfaces 13b, 11b restrict relative movements between the friction member 15 and the pressure plate 13 and between the friction member 16 and the cover plate 11 by means of the retaining surfaces 13b, 11b and the aforementioned projection-recess shapes (the concavo-convex shapes) of the surfaces of the friction members 15, 16 opposing the retaining surfaces 13b, 11b. In case the friction members 15, 16 include a hole or a recess, the grooves 15b, 16b are provided in positions where neither the hole nor the recess is formed so as to secure a thickness of the friction members 15, 16, thereby ensuring strength. The thickness of the friction members 15, 16 at the portions where the grooves 15b, 16b are provided is, desirably, for example, 1 millimeter or more. It is also desirable that a width of each of the grooves 15b, 16b is 0.5 millimeters or more, a depth of each of the grooves 15b, 16b is 0.1 millimeters or more, and a distance between a circumferential sidewall of the grooves 15b, 16b and the circumferential sidewall of the adjacent grooves 15b, 16b is 20 millimeters or less. Slide surfaces 15c, 16c of the friction members 15, 16 are formed to be flat. The friction members 15, 16 include binding materials 15e, 16e (for example, rubber) that include therein fibrous base materials 15d, 16d (for example, glass fibers). On the retaining surfaces 15a, 16a (excluding the grooves 15b, 16b) of the friction members 15, 16, an exposure rate of the base materials 15d, 16d is 70 percent or less, desirably, for example, 50 percent or less, in order to improve a friction coefficient of the retaining surfaces 15a, 16a. Other structures of the fifth embodiment are identical to those of the first embodiment, and explanations will be omitted. In the fifth embodiment, the recesses 11c, 13c and the projections 11d, 13d that improve the frictional resistance may not be formed at the retaining surfaces 11b, 13b of the cover plate 11 and the pressure plate 13, respectively. Further, the aforementioned configuration according to the fifth embodiment may be combined with the configuration of any of the first to fourth embodiments.

According to the fifth embodiment, advantages similar to the first embodiment are attained. In addition, the exposure rate of the binding materials 15e, 16e is increased (that is, the exposure rate of the base materials 15d, 16d is decreased) by providing the grooves 15b, 16b on the retaining surfaces 15a, 16a of the friction members 15, 16, and thus the friction coefficient of the retaining surfaces 15a, 16a is improved.

Figure 7:
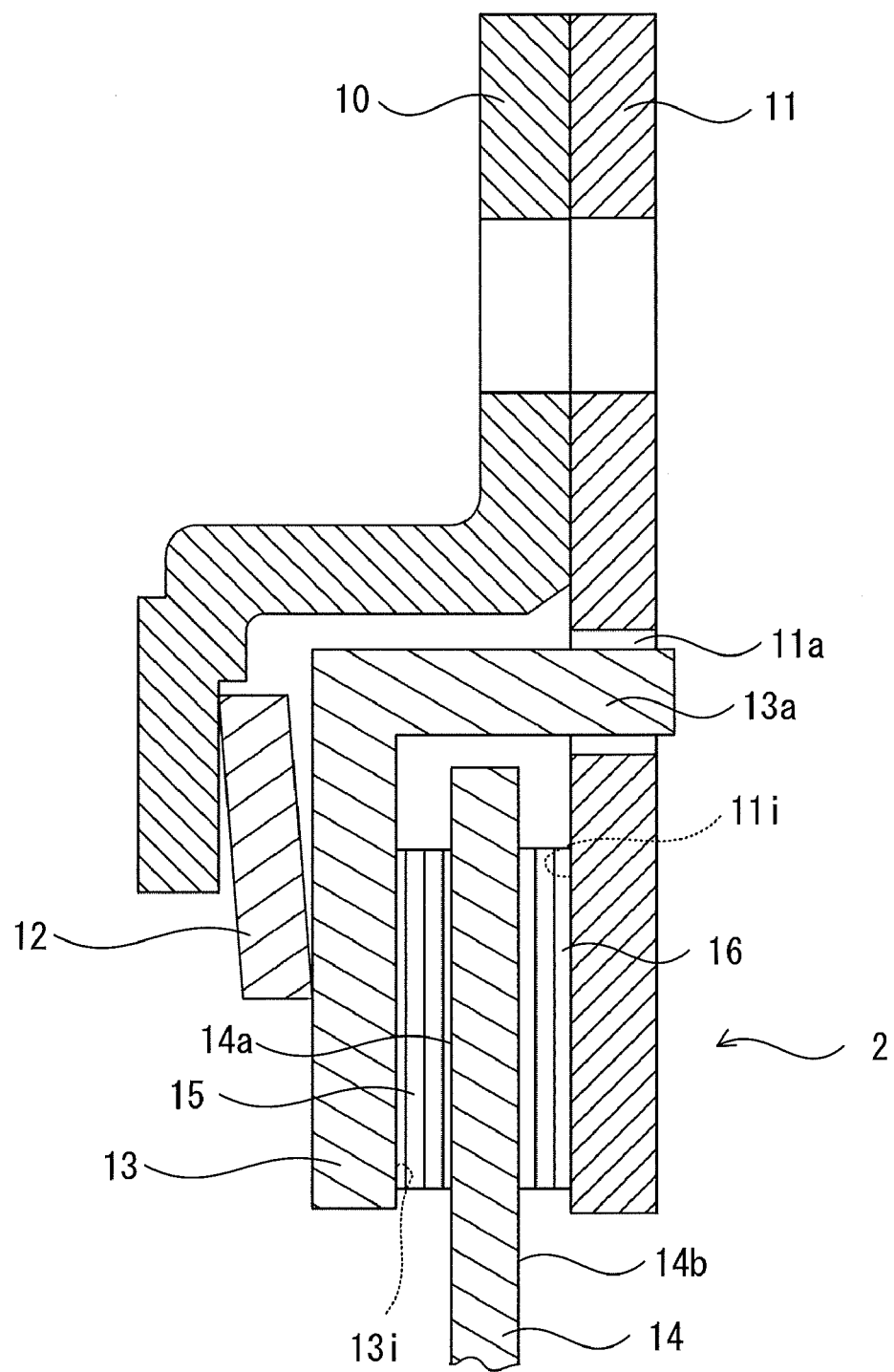
FIG. 7 is a partial radial section view schematically illustrating the structure of the limiter portion according to a sixth embodiment disclosed here.

A sixth embodiment of this disclosure will be explained with reference to illustrations of drawings as follows. FIG. 7 is a partial radial section view schematically illustrating the structure of the limiter portion 2.

The sixth embodiment is a variation of the first embodiment. In the sixth embodiment, water, salt water, chemicals, or the like is applied entirely or partially to fixing surfaces 11i, 13i of the cover plate 11 and the pressure plate 13 respectively, before the pressure plate 13 and the cover plate 11 are assembled on the friction members 15, 16, and the like. Then, rust generated at the pressure plate 13 is used for fixing or retaining the friction member 15 to the fixing surface 13i of the pressure plate 13 while rust generated at the cover plate 11 is used for fixing or retaining the friction member 16 to the fixing surface 11i of the cover plate 11. The rust at the fixing surfaces 13i, 11i penetrates through fibrous base materials of the friction members 15, 16 so that the fixing surfaces 13i, 11i of the pressure plate 13 and the cover plate 11 are fixed to the friction members 15, 16 respectively. Axial surfaces of the lining plate 14 in contact with the friction members 15, 16 serve as slide surfaces 14a, 14b respectively. Other structures of the sixth embodiment are identical to the first embodiment, and explanations will be omitted.

According to the sixth embodiment, the axial surfaces of the lining plate 14, which oppose the friction members 15, 16 respectively, refer to the sliding surfaces, the axial surface of the cover plate 11, which opposes the friction member 16, refers to the fixing surface (i.e., the retaining surface), and the axial surface of the pressure plate 13, which opposes the friction member 15, refers to the fixing surface (the retaining surface). Consequently, there is no need for securely attaching the friction members 15, 16 to other members by means of an adhesive, thereby reducing a cost. Further, the number of parts is reduced, which further reduces the cost. Still further, because the sliding surface is determined, a slipping torque generated at the limiter portion 2 is stabilized. Still further, no backlash occurs between the friction member 16 and the cover plate 11 at the fixing surface, or between the friction member 15 and the pressure plate 13 at the fixing surface. This reduces abrasions of the related members.

Figure 8:
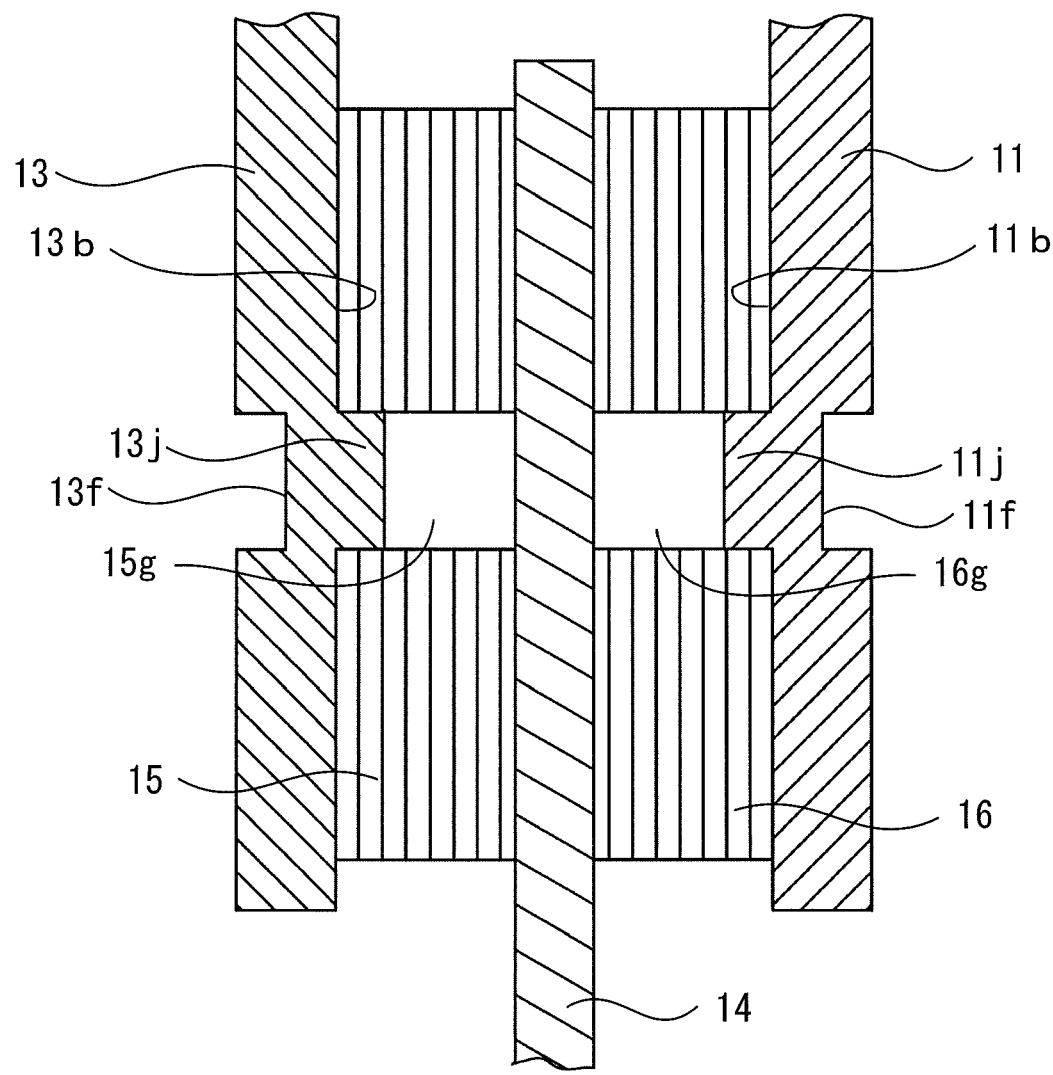
FIG. 8 is a partial radial section view schematically illustrating the structure of the limiter portion according to a seventh embodiment disclosed here.
Figure 9A:
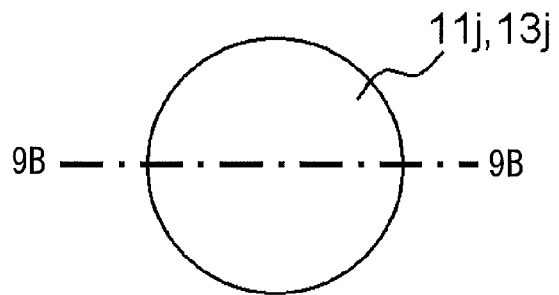
FIG. 9A is a partial plane view schematically illustrating projections formed at the cover plate and the pressure plate according to the seventh embodiment.
Figure 9B:
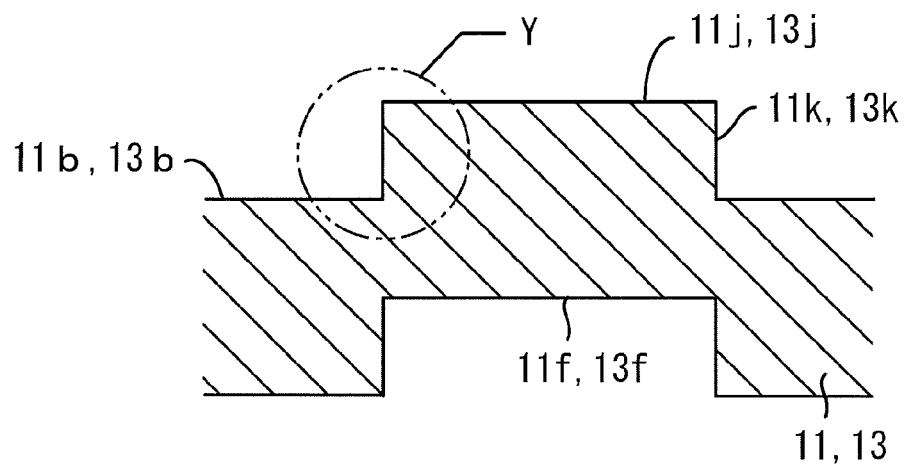
FIG. 9B is a partial section view taken on line 9B-9B illustrated in FIG. 9A.
Figure 9C:
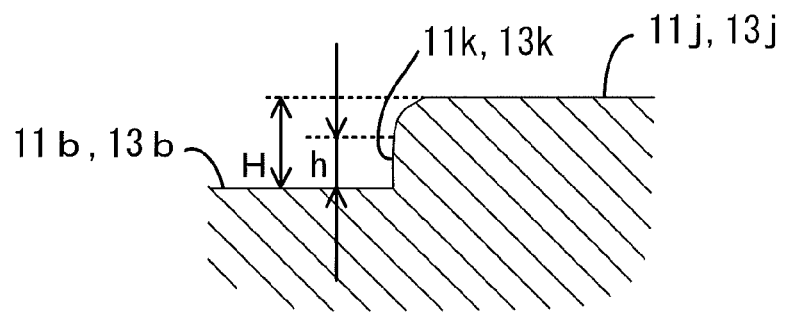
FIG. 9C is an enlarged section view of an area Y illustrated in FIG. 9B.

A seventh embodiment of this disclosure will be explained with reference to illustrations of drawings as follows. FIG. 8 is a partial radial section view schematically illustrating the structure of the limiter portion 2. FIG. 9A is a partial plane view schematically illustrating the structure of the retaining surface 11b of the cover plate 11 and the retaining surface 13b of the pressure plate 13 according to the seventh embodiment. FIG. 9B is a partial section view taken on line 9B-9B illustrated in FIG. 9A. FIG. 9C is an enlarged section view of an area Y illustrated in FIG. 9B.

The seventh embodiment is a variation of the first embodiment. In the seventh embodiment, the recesses 11c, 13c and the projections 11d, 13d that improve the frictional resistance are not formed at the retaining surfaces 11b, 13b of the cover plate 11 and the pressure plate 13, respectively. Instead, the friction members 15, 16 include through holes (or recess portions or cut portions having bottoms) 15g, 16g respectively serving as first and second engagement portions. Then, a projection (which may be a pawl) 11j and a stepped recess 11f are provided at respective portions (specifically, respective axial sides) of the cover plate 11 so as to axially face the through hole 16g while a projection (which may be a pawl) 13j and a stepped recess 13f are provided at respective portions (specifically, respective axial sides) of the pressure plate 13 so as to axially face the through hole 15g. The projections 11j, 13j serving as first and second engagement projections engage with the through holes 16g, 15g respectively to thereby retain the friction member 15 by the pressure plate 13 in a relatively unrotatable manner and retain the friction member 16 by the cover plate 11 in a relatively unrotatable manner. Other structures of the seventh embodiment are identical to the first embodiment, and explanations will be omitted.

The cover plate 11 includes the projection 11j at the retaining surface 11b so as to engage with the through hole 16g of the friction member 16. The projection 11j engages with the through hole 16g of the friction member 16 to thereby retain the friction member 16 in a relatively unrotatable manner. The cover plate 11 includes the stepped recess 11f at one of the axial sides where the projection 11j is not formed, i.e., the opposite surface of the retaining surface 11b, so that the stepped recess 11f axially faces the projection 11j. The projection 11j is formed by the first die punching relative to the retaining surface 11b while the stepped recess 11f is formed by the second die punching relative to the opposite surface of the retaining surface 11b. Each side wall of the projection 11j includes a vertical portion (vertical surface) 11k perpendicular to the flat portion of the retaining surface 11b as illustrated in FIG. 9. A height of the vertical portion 11k is desirably specified to be equal to or greater than 30% of an overall height H of the projection 11j from the flat portion of the retaining surface 11b, for example. The overall height H of the projection 11j is desirably specified to be equal to or greater than 0.5 mm, for example. A planar shape of the projection 11j is a round shape, for example, having the diameter equal to or greater than 2 mm. Other structures of the cover plate 11 according to the seventh embodiment are identical to those of the first embodiment illustrated in FIG. 1.

The pressure plate 13 includes the projection 13j at the retaining surface 13b so as to engage with the through hole 15g of the friction member 15. The projection 13j engages with the through hole 15g of the friction member 15 to thereby retain the friction member 15 in a relatively unrotatable manner. The pressure plate 13 includes the stepped recess 13f at one of the axial sides where the projection 13j is not formed, i.e., the opposite surface of the retaining surface 13b, so that the stepped recess 13f axially faces the projection 13j. The projection 13j is formed by the first die punching relative to the retaining surface 13b while the stepped recess 13f is formed by the second die punching relative to the opposite surface of the retaining surface 13b. Each side wall of the projection 13j includes a vertical portion (vertical surface) 13k perpendicular to the flat portion of the retaining surface 13b as illustrated in FIG. 9. A height of the vertical portion 13k is desirably specified to be equal to or greater than 30% of an overall height H of the projection 13j from the flat portion of the retaining surface 13b, for example. The overall height H of the projection 13j is desirably specified to be equal to or greater than 0.5 mm, for example. A planar shape of the projection 13j is a round shape, for example, having the diameter equal to or greater than 2 mm. Other structures of the pressure plate 13 according to the seventh embodiment are identical to those of the first embodiment illustrated in FIG. 1.

The friction member 15 includes the multiple through holes 15g engaging with the respective projections 13j of the pressure plate 13. The friction member 16 includes the multiple through holes 16g engaging with the respective projections 11j of the cover plate 11. Other structures of the friction members 15, 16 according to the seventh embodiment are identical to those of the first embodiment illustrated in FIG. 1.

The aforementioned configuration according to the seventh embodiment may be combined with the configuration of any of the first to sixth embodiments.

Figure 10:
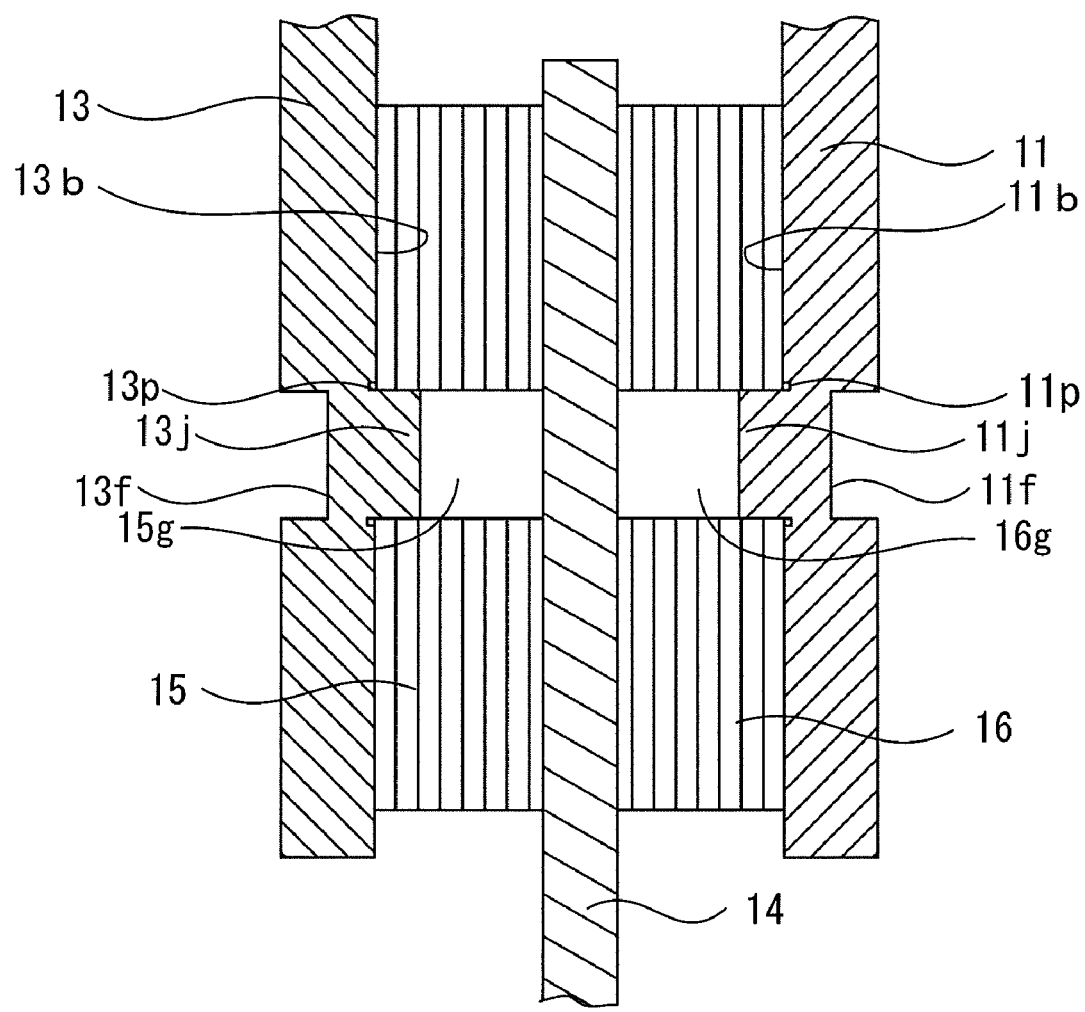
FIG. 10 is a partial radial section view schematically illustrating the structure of the limiter portion according to an eighth embodiment disclosed here.
Figure 11A:
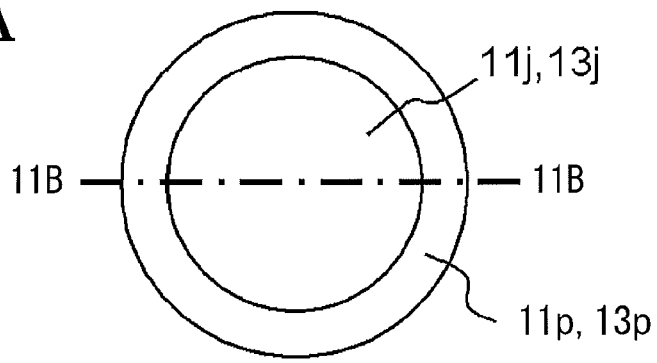
FIG. 11A is a partial plane view schematically illustrating the structure of the retaining surface of the cover plate and the retaining surface of the pressure plate according to the eighth embodiment.
Figure 11B:
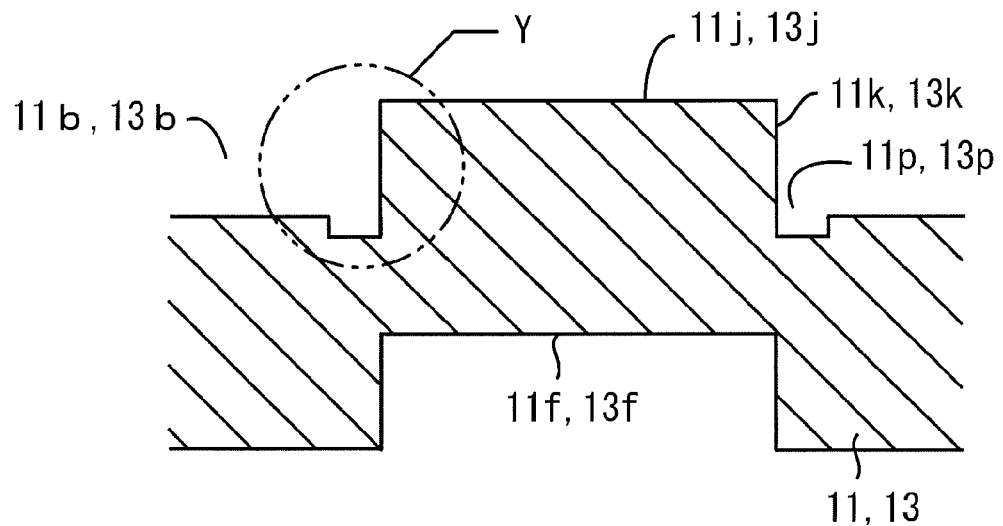
FIG. 11B is a partial section view taken on line 11B-11B illustrated in FIG. 11A.
Figure 11C:
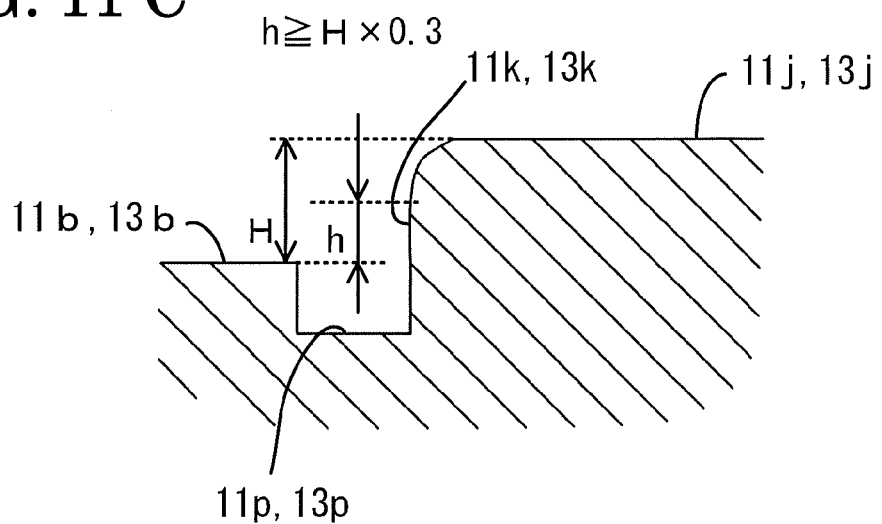
FIG. 11C is an enlarged section view of an area Y illustrated in FIG. 11B.

An eighth embodiment of this disclosure will be explained with reference to illustrations of drawings as follows. FIG. 10 is a partial radial section view schematically illustrating the structure of the limiter portion 2. FIG. 11A is a partial plane view schematically illustrating the structure of the retaining surface 11b of the cover plate 11 and the retaining surface 13b of the pressure plate 13 according to the eighth embodiment. FIG. 11B is a partial section view taken on line 10B-10B illustrated in FIG. 11A. FIG. 10C is an enlarged section view of an area Y illustrated in FIG. 11B.

The eighth embodiment is a variation of the seventh embodiment. In the eighth embodiment, grooves 11p, 13p are formed at peripheral edges of respective base portions of the projections 11j, 13j. The projection 11j and the groove 11p are formed by the first die punching relative to the retaining surface 11b while the stepped recess 11f is formed by the second die punching relative to the opposite surface of the retaining surface 11b. In the same way, the projection 13j and the groove 13p are formed by the first die punching relative to the retaining surface 13b while the stepped recess 13f is formed by the second die punching relative to the opposite surface of the retaining surface 13b. Each side wall of the projection 11*j* includes the vertical portion 11*k* perpendicular to the flat portion of the retaining surface 11*b*. Each side wall of the projection 13*j* includes the vertical portion 13*k* perpendicular to the flat portion of the retaining surface 13*b* as illustrated in FIG. 11B. The height h of each of the vertical portions 11*k*, 13*k* is desirably specified to be equal to or greater than 30% of the overall height H (i.e., the height from the flat portion of each of the retaining surfaces 11*b*, 13*b*) of each of the projections 11*j*, 13*j*, for example. The overall height H of each of the projections 11*j*, 13*j* is desirably specified to be equal to or greater than 0.5 mm, for example. Other structures according to the seventh embodiment are identical to those of the first embodiment.

According to the eighth embodiment, advantages similar to the seventh embodiment are attained.

Figure 12A:
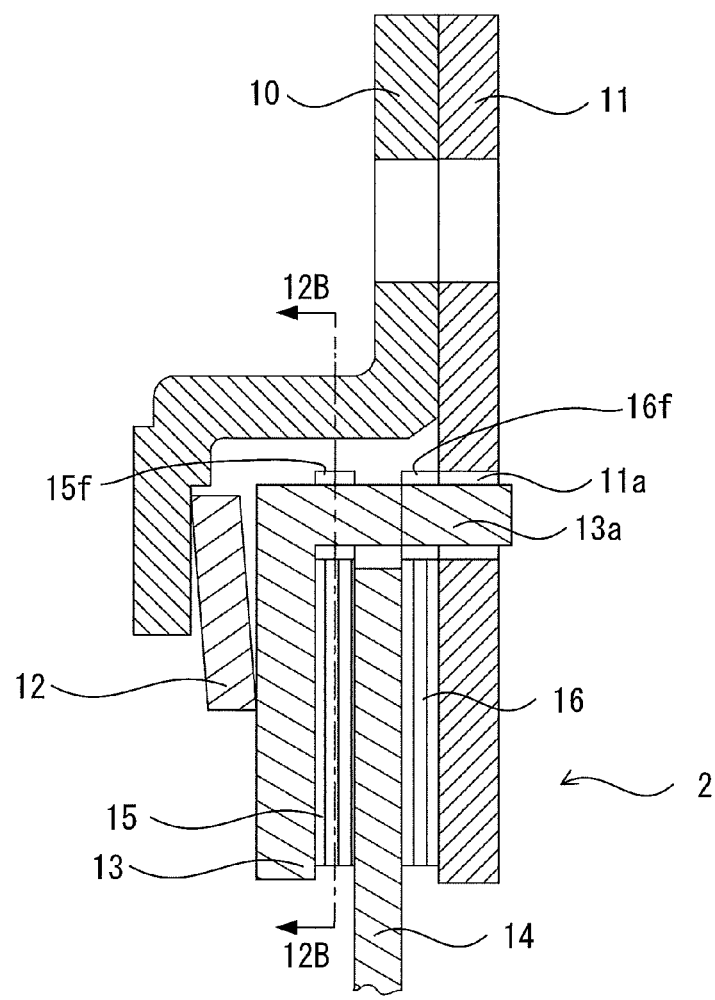
FIG. 12A is a partial radial section view schematically illustrating the structure of the limiter portion according to a ninth embodiment disclosed here.
Figure 12B:
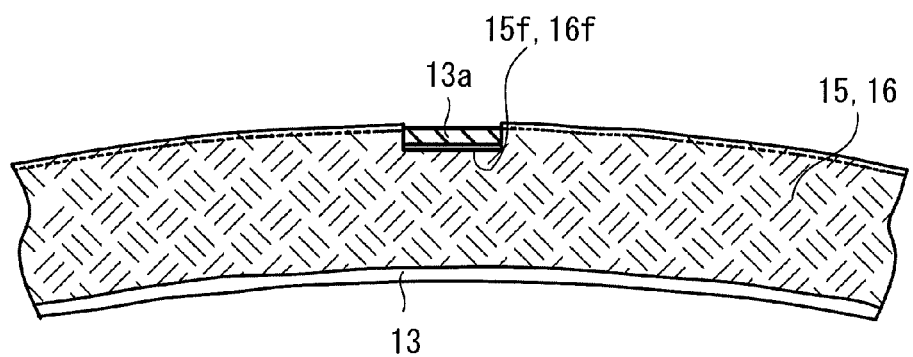
FIG. 12B is a partial section view taken on line 12B-12B illustrated in FIG. 12A.

A ninth embodiment of this disclosure will be explained with reference to illustrations of drawings as follows. FIG. 12A is a partial radial section view schematically illustrating the structure of the limiter portion 2. FIG. 12B is a partial section view taken on line 12B-12B illustrated in FIG. 12A. In FIG. 12B, the support plate 10 is omitted.

The ninth embodiment is a variation of the first embodiment. In the ninth embodiment, the recesses 11*c*, 13*c* and the projections 11*d*, 13*d* that improve the frictional resistance are not formed at the retaining surfaces 11*b*, 13*b* of the cover plate 11 and the pressure plate 13, respectively. Instead, the friction members 15, 16 extend further outwardly and include cut portions (or holes) 15*f*, 16*f* respectively serving as engagement cut portions. Then, the detent 13*a* of the pressure plate 13 engages with the cut portions 15*f*, 16*f* so that the friction member 15 is retained by the pressure plate 13 in a relatively unrotatable manner while the friction member 16 is retained by the cover plate 11 in a relatively unrotatable manner. Other structures according to the ninth embodiment are identical to those of the first embodiment.

The aforementioned configuration according to the ninth embodiment may be combined with the configuration of any of the first to seventh embodiments.

According to the ninth embodiment, the detent 13*a* of the pressure plate 13 engages with the cut portions 15*f*, 16*f* of the friction members 15, 16 to thereby retain the friction member 15 by the pressure plate 13 and retain the friction member 16 by the cover plate 11. Therefore, the axial surfaces of the lining plate 14, which oppose the friction members 15, 16 respectively, refer to the sliding surfaces, the axial surface of the cover plate 11, which opposes the friction member 16, refers to the retaining face, and the axial surface of the pressure plate 13, which opposes the friction member 15, refers to the retaining surface. Consequently, there is no need for securely attaching the friction members 15, 16 to other members by means of an adhesive, thereby reducing a cost. Further, the number of parts is reduced, which further reduces the cost. Still further, because the sliding surface is determined, a slipping torque generated at the limiter portion 2 is stabilized.

Figure 13A:
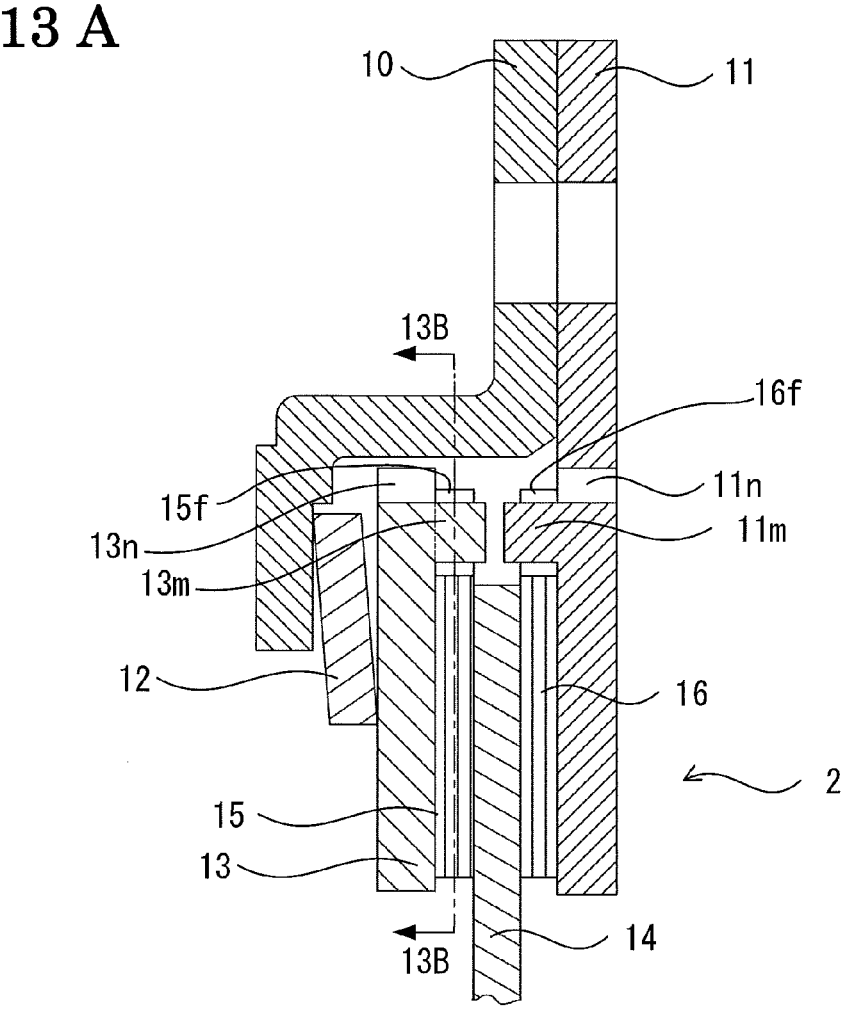
FIG. 13A is a partial radial section view schematically illustrating the structure of the limiter portion according to a tenth embodiment disclosed here.
Figure 13B:
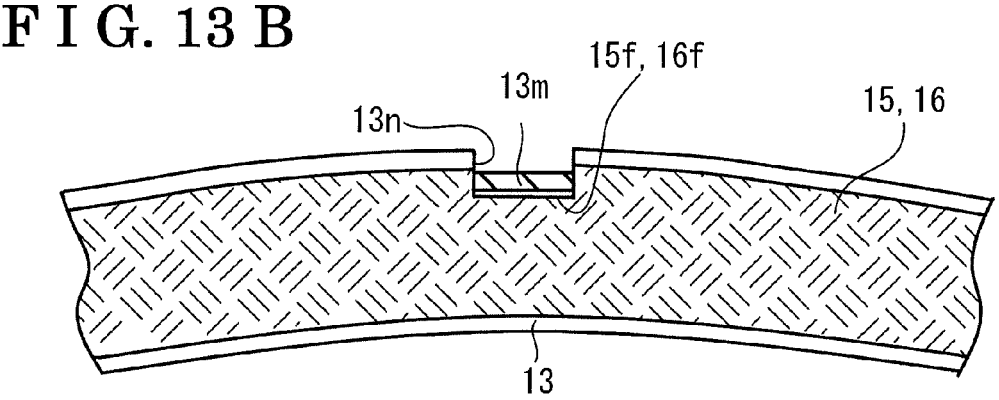
FIG. 13B is a partial section view taken on line 13B-13B illustrated in FIG. 13A.

A tenth embodiment of this disclosure will be explained with reference to illustrations of drawings as follows. FIG. 13A is a partial radial section view schematically illustrating the structure of the limiter portion 2. FIG. 13B is a partial section view taken on line 13B-13B illustrated in FIG. 13A. In FIG. 13B, the support plate 10 is omitted.

The tenth embodiment is a variation of the ninth embodiment. In the tenth embodiment, the friction members 15, 16 are not retained in a relatively unrotatable manner by means of the detent 13*a* of the pressure plate 13 relative to the pressure plate 13 and the cover plate 11. Instead, pawl portions 13*m*, 11*m* are formed at the pressure plate 13 and the cover plate 11 respectively in a direction towards the lining plate 14. The pawl portion 13*m* engages with the cut portion 15*f* of the friction member 15 and the pawl portion 11*m* engages with the cut portion 16*f* of the friction member 16 so that the friction members 15, 16 are retained by the pressure plate 13 and the cover plate 11 respectively in a relatively unrotatable manner. As illustrated in FIG. 13A, the pawl portion 13*m* is obtained by a bending of a portion of the pressure plate 13. In the same way, the pawl portion 11*m* is obtained by a bending of a portion of the cover plate 11. Voids of the cover plate 11 and the pressure plate 13 obtained by the bending of the respective portions of the cover plate 11 and the pressure plate 13 serve as window portions 11*n*, 13*n* respectively. In FIGS. 13A and 13B, the pawl portions 11*m*, 13*m*, and the cut portions 15*f*, 16*f* are provided in the vicinity of the outer circumferences of the friction members 15, 16. Alternatively, the pawl portions 11*m*, 13*m*, and the cut portions 15*f*, 16*f* may be provided in the vicinity of intermediate portions or inner circumferences of the friction members 15, 16. Other structures of the tenth embodiment are identical to those of the seventh embodiment.

The aforementioned configuration according to the tenth embodiment may be combined with the configuration of any of the first to seventh embodiments.

According to the tenth embodiment, advantages similar to the ninth embodiment are attained.

The aforementioned first to tenth embodiments may be modified or adjusted in an appropriate manner.

According to the aforementioned first to tenth embodiments, an adhesive is not used to attach or fix the friction members 15, 16 to the other member. Thus, a reduced cost and strength of each of the friction members 15, 16 are both obtained. In addition, because of a reduction of the number of parts, further reduced cost may be achieved. Further, the sliding surfaces are determined to be between the lining plate 14 and the friction member 15, and between the lining plate 14 and the friction member 16, so that the slipping torque generated at the limiter portion 2 is stabilized. Furthermore, no backlash occurs between the cover plate 11 and the friction member 16, or between the pressure plate 13 and the friction member 15. This reduces abrasions of the related members.

According to the aforementioned third embodiment, the pressure plate 13 includes the through hole 13*g* at the retaining surface 13*b* and the multiple convexes 13*h* formed around the through hole 13*g* in a radial manner relative to the through hole 13*g*, a height of each of the convexes 13*h* in an axial direction of the pressure plate 13 and a width of each of the convexes 13*h* in a direction perpendicular to the axial direction decreasing in association with an increase of a radial distance from the through hole 13*g* so that each of the convexes 13*h* forms a sharpened edge.

According to the aforementioned fifth embodiment, the retaining surface 15*a* of the friction member 15 facing the retaining surface 13*b* of the pressure plate 13 forms into a concavo-convex shape.

According to the fifth embodiment, the friction member 15 includes a hole or a recess at the retaining surface 15*a*, and the grooves 15*b* are prevented from being formed at a portion of the friction member 15 where the hole or the recess is formed.

According to the fifth embodiment, the friction member 15 includes the fibrous base material 15*d* in the binding material 15*e* and the exposure rate of the base material 15*d* at the retaining surface 15*a* of the friction member 15 facing the retaining surface 13*b* of the pressure plate 13 is equal to or less than 70 percent.

According to the aforementioned seventh and eighth embodiments, the pressure plate 13 includes the projection 13*j* at the retaining surface 13*b* and the friction member 15 includes the through hole 15*g* engaging with the projection 13*j* of the pressure plate 13.

According to the aforementioned first and second embodiments, the retaining surface 13*b* of the pressure plate 13 is entirely or partially formed by one of or both of the projections 13*d* and the recesses 13*c* for generating a slip resistance relative to the friction member 15.

According to the first and second embodiments, the torque fluctuation absorbing apparatus 1 further includes the cover plate 11 arranged at the opposite side of the pressure plate 13 relative to the lining plate 14 and being rotatable relative to the lining plate 14, and the friction member 16 disposed between the lining plate 14 and the cover plate 11 and pressed against the lining plate 14 in a slidable manner. The cover plate 11 includes the retaining surface 11*b* that makes contact with the friction member 16. The retaining surface 11*b* is entirely or partially formed by one of or both of the projections 11*d* and the recesses 11*c* for generating a slip resistance relative to the friction member 16.

According to the aforementioned first and second embodiments, the retaining surface 13*b* includes the recess 13*c* of which the height is lower than the height of the flat portion (flat surface) of the retaining surface 13*b* and includes the projection 13*d* at a peripheral edge of the recess 13*c*. The height of the projection 13*d* is higher than the height of the flat portion of the retaining surface 13*b*.

According to the second embodiment, the retaining surface 13*b* includes the stepped projection 13*e* evenly projecting from the flat portion of the retaining surface 13*b*, the recess 13*c* formed at a portion of the stepped projection 13*e*, the height of the recess 13*c* being lower than the height of the surface of the stepped projection 13*e*, and the projection 13*d* formed at a peripheral edge of the recess 13*c*, the height of the projection 13*e* being higher than the height of the surface of the stepped projection 13*e*. The pressure plate 13 includes the stepped recess 13*f* at the opposite surface relative to the retaining surface 13*b*, the retaining surface 13*b* and the opposite surface being formed at the axial side surfaces of the pressure plate 13 respectively, the stepped recess 13*f* axially facing the stepped projection 13*e* and being recessed greater than the flat portion of the opposite surface of the pressure plate 13.

According to the first embodiment, the recess 13*c* and the projection 13*d* are formed by die punching relative to the retaining surface 13*b*, and a plurality of combinations of the recess 13*c* and the projection 13*d* is formed at an area obtained by the die punching one time relative to the retaining surface 13*b*.

According to the second embodiment, the stepped projection 13*e*, the recess 13*c*, the projection 13*d*, and the stepped recess 13*f* are formed by the first die punching relative to the retaining surface 13*b* and by the second die punching relative to the opposite surface relative to the retaining surface 13*b*. A plurality of combinations of the recess 13*c* and the projection 13*d* is formed at the portion of the stepped projection 13*e*.

According to the aforementioned seventh embodiment, the projection 13*j* includes the side wall having the vertical surface 13*k* perpendicular to the flat portion of the retaining surface 13*b* of the pressure plate 13.

According to the seventh embodiment, the cover plate 11 includes the projection 11*j* at the retaining surface 11*b* and the friction member 16 includes the through hole 16*g* engaging with the projection 11*j* of the cover plate 11.

According to the aforementioned ninth embodiment, the cover plate 11 includes the hole 11*a*, and the pressure plate 13 includes the detent 13*a* inserted into the hole 11*a* of the cover plate 11 in a relatively unrotatable manner and an axially movable manner. The friction members 15, 16 include respective cut portions 15*f*, 16*f* engaging with the detent 13*a* of the pressure plate 13.

The torque fluctuation absorbing apparatus 1 further includes the cover plate 11 arranged at the opposite side of the pressure plate 13 relative to the lining plate 14 and being rotatable relative to the lining plate 14, and the friction member 16 disposed between the lining plate 14 and the cover plate 11 and pressed against the lining plate 14 in a slidable manner. The cover plate 11 includes the projection 11*j* at the retaining surface 11*b* and the friction member 16 includes the through hole 15*g* engaging with the projection 11*j* of the cover plate 11.

According to the aforementioned fourth embodiment, each of the retaining surfaces 11*b*, 13*b* includes a knurled surface having a pattern of raised-up areas and depressed areas.

According to the aforementioned seventh embodiment, the height of the vertical surfaces 11*k*, 13*k* is specified to be equal to or greater than 30% of the overall height H of the projections 11*j*, 13*j* from the flat portion of the retaining surfaces 11*b*, 13*b*.

According to the sixth embodiment, the torque fluctuation absorbing apparatus 1 includes the lining plate 14, the pressure plate 13 rotatable relative to the lining plate 14, the friction member 15 disposed between the lining plate 14 and the pressure plate 13 and making contact with the lining plate 14 in a pressing manner and a slidable manner, the pressure plate 13 including the retaining surface 13*b* that makes contact with the friction member 15, the friction member 15 being fixed to the retaining surface 13*b* by a rust generated entirely or partially at the retaining surface 13*b*.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A torque fluctuation absorbing apparatus comprising:
a first plate member;
a second plate member rotatable relative to the first plate member; and
a first friction member disposed between the first plate member and the second plate member and pressed against the first plate member in a slidable manner;
the second plate member including a first engagement projection which is integral with the second plate member and is provided at a first retaining surface of the second plate member to project from the first retaining surface,
the first friction member including a first engagement portion formed into either a hole shape, a recess shape, or a cut shape at a surface facing the second plate member, the first engagement portion engaging with the first engagement projection of the second plate member.

2. The torque fluctuation absorbing apparatus according to claim 1, wherein the first engagement projection includes a side wall having a vertical surface perpendicular to a flat portion of the first retaining surface of the second plate member.

3. The torque fluctuation absorbing apparatus according to claim 1, further comprising a third plate member arranged at an opposite side of the second plate member relative to the first plate member and being rotatable relative to the first plate member, and a second friction member disposed between the first plate member and the third plate member and pressed against the first plate member in a slidable manner, wherein the third plate member includes a second engagement projection at a second retaining surface and the second friction member includes a second engagement portion formed into either a hole shape, a recess shape, or a cut shape engaging with the second engagement projection of the third plate member.

4. The torque fluctuation absorbing apparatus according to claim 1, wherein the first engagement portion of the second plate member is formed by die punching relative to the first retaining surface.

* * * * *